Patented Oct. 31, 1933

1,933,410

UNITED STATES PATENT OFFICE 1,933,410

TREATMENT OF WASTE PRODUCTS OBTAINED IN THE REFINING OF HYDROCARBON MATERIAL

Sidney Martin Blair, London, England, Francis Leopold Melvill, Arthur George Vale Berry, and Bernard George Banks, Pointe-a-Pierre, Trinidad, British West Indies, assignors to Trinidad Leaseholds, Limited, London, England No Drawing. Application May 5, 1932, Serial No. 609,556, and in Great Britain May 18, 1931

1 Claim. (Cl. 260—154)

This invention relates to the treatment of the alkaline wash liquors which have been employed in the refining of hydrocarbons derived from petroleum oil and particularly the alkali wash liquors which have been employed in the treatment of cracked petroleum oils.

In the refining of oils of the character indicated use is made of an aqueous solution of alkali, for instance, caustic soda or an aqueous solution of caustic alkali in which litharge has been dissolved with the result that salts of the acidic bodies present in the oils treated are formed.

The object of the invention is to recover the organic acidified bodies from such alkaline wash liquors.

The process according to the invention comprises subjecting the product obtained by acidifying the wash liquors and separating therefrom the oily layer containing the acidic bodies, to distillation to obtain a fraction having a boiling range of 180 to 270° C., treating the fraction with a reducing agent to convert the disulphides present in the fraction into the corresponding mercaptans, fractionally distilling the reduction product, oxidizing the several fractions thus obtained whereby the mercaptans will be converted into disulphides and subjecting the fractions containing the oxidized products to fractional distillation whereby, on the one hand, phenolic bodies relatively free from disulphides and, on the other hand, disulphides relatively free from phenolic bodies are obtained.

Hydrogen sulphide in a relatively pure state or instead gases containing hydrogen sulphide such, for instance, as are produced in the cracking process, may be employed for the acidification of the wash liquor.

Hydrogen sulphide being a stronger acid than certain of the acidic bodies originally present in the oil reacts with the sodium salts of these acidic bodies with the formation of sodium sulphide and the liberation of the organic acidic bodies, which being insoluble or only slightly soluble in the water separate, in part at least, as a dark coloured oily layer. The material constituting the oily layer thus separating contains in addition to the organic acidic bodies more or less water in the form of a suspension or emulsion and the separation of this water may be effected by acidification of the oily material in question.

This further acidification as an oily layer may be effected with the aid of sulphuric acid, preferably, by making successive small additions of the acid with intervening separations of the aqueous material which settles out from the oil.

By such successive treatments with an acid and intervening separations the total proportion of acid used relatively to the acidic bodies obtained is less than if the necessary quantity of acid were added in one stage.

In the reaction between hydrogen sulphide and the alkali extract there occurs considerable frothing which is open to objection in that it results in the loss of material by entrainment in the gas and in the necessity for equipment of appreciably greater capacity than would be necessary if such frothing did not occur.

Such losses may be avoided by effecting the reaction between hydrogen sulphide or gases containing hydrogen sulphide and the aqueous extract, by causing the aqueous material and the gas to travel in counter-current. In this way, moreover, separation of the oily material consisting of or containing the organic acidic bodies from the aqueous material present in the reaction product is promoted.

By subjecting the aqueous material contained in the reaction product, after the separation of the oily material, to extraction with an organic volatile solvent of relatively low boiling point which is substantially insoluble in water. For this purpose a petroleum hydrocarbon material of the character of aviation spirit may be employed.

Conveniently, the extract and the oily material are mixed together.

Preferably, the resulting mixture is treated with a material which is a stronger acid chemically than any of the organic acidic bodies present in the mixture whereby water and bodies soluble in water which may be held in solution or suspension in the mixture may be caused to separate.

The treatment with this stronger acid is conveniently effected by making successive small additions of acid, followed by agitation with intervening separation of the aqueous liquid from the oily material.

By making the addition of acid in this way the proportion of oily material secured relatively to the quantity of acid employed is greater than if the whole of the acid required is added in one portion.

The oily material consisting of organic acidic bodies is brought together with the product obtained by extraction of the aqueous liquid the mixture of the two is subjected to distillation, the solvent and any water which is present in the material first distilling over.

The fraction boiling up to approximately 110° C. is found to contain the whole of the water present together with the greater part of the light solvent added previously. The distillate boiling between 110 and 180° C. is collected separately and consists of the less volatile portion of the solvent used, together with a proportion of the acidic bodies of lower boiling point. These acidic bodies consist chiefly of mercaptans.

The fractional distillation may be continued to secure a fraction boiling between 180 and 270° C. This fraction consists chiefly of compounds similar to the phenols together with more or less mercaptans and disulphides.

The distillation residue is a tarry material boiling above 270° C. and containing a considerable proportion of organic disulphides together with compounds which are soluble in alkaline solutions.

The fraction boiling between 180 to 270° C. is treated with a reducing agent whereby the disulphides present in the fraction are converted into the corresponding mercaptans and the reduction product fractionally distilled.

Such reduction may be effected with the aid of iron and sulphuric acid and the fractional distillation may be carried out so as to obtain a fraction boiling up to 180° C., which will consist chiefly of mercaptans, and further fractions of higher boiling point. While the number of fractions secured at this stage may be varied, the fractionation is, conveniently, carried out to obtain fractions boiling between 180 to 220° C., 220 and 270° C., and a residue of 270° C. These individual fractions thus obtained are then oxidized whereby the mercaptans present therein will be converted into disulphides.

The oxidation may be effected by the action of air upon the several fractions at or near their initial boiling points. For instance, each individual fraction may be heated in a vessel provided with a reflux condenser air being introduced into the hot liquid until the oxidation of the mercaptans present in the fraction is complete, the oxidation product of each fraction being subjected to further distillation and the distillation in each case being carried out to a point where disulphides begin to distil and then stopped.

The distillate produced up to that point is substantially free from disulphides and mercaptans and is suitable for use in the preparation of insecticides, disinfectants, wood preservatives, resins and other commercial products for which organic compounds of a phenolic nature are used as a raw material. The tarry residue at 270° C. may be mixed with the several residues from the oxidized fractions, and the mixture used for the manufacture of wood preservative, or may be further separated into portions consisting of high-boiling phenols, mercaptans, disulphides and asphaltic material.

Having now described our invention, what we claim as new and desire to secure by Letters Patent is:—

The process of treating alkaline wash liquors which have been employed in the refining of hydrocarbons derived from petroleum oils and particularly the alkali wash liquors which have been employed in the treatment of cracked petroleum oils which comprises subjecting the product obtained by acidifying the wash liquors and separating therefrom the oily layer containing the acidic bodies to distillation to obtain a fraction having a boiling range of 180 to 270° C., reacting the fraction with a reducing agent to convert the disulphides present in the fraction into the corresponding mercaptans, thereafter fractionally distilling the said fraction, oxidizing the several fractions thus obtained whereby the mercaptans will be converted into disulphides and subjecting the fractions containing the oxidized products to fractional distillation whereby, on the one hand, phenolic bodies relatively free from disulphides and, on the other hand, disulphides relatively free from phenolic bodies are obtained.

S. M. BLAIR.
FRANCIS LEOPOLD MELVILL.
ARTHUR GEORGE VALE BERRY.
BERNARD GEORGE BANKS.